(12) United States Patent
Rafsky et al.

(10) Patent No.: US 8,838,584 B2
(45) Date of Patent: Sep. 16, 2014

(54) METHOD FOR SELECTING A SUBSET OF CONTENT SOURCES FROM A COLLECTION OF CONTENT SOURCES

(75) Inventors: Lawrence C. Rafsky, Livingston, NJ (US); Thomas B. Donchez, Bethlehem, PA (US)

(73) Assignee: Acquire Media Ventures, Inc., Roseland, NJ (US)

( * ) Notice: Subject to any disclaimer, the term of this patent is extended or adjusted under 35 U.S.C. 154(b) by 114 days.

(21) Appl. No.: 13/434,312

(22) Filed: Mar. 29, 2012

(65) Prior Publication Data

US 2012/0259846 A1 Oct. 11, 2012

Related U.S. Application Data

(60) Provisional application No. 61/468,876, filed on Mar. 29, 2011.

(51) Int. Cl.
*G06F 17/30* (2006.01)
(52) U.S. Cl.
CPC .............................. *G06F 17/30867* (2013.01)
USPC ......................................... 707/723; 707/709
(58) Field of Classification Search
USPC ........... 707/723, 767, 709, 688; 705/37, 26.3, 705/10
See application file for complete search history.

(56) References Cited

U.S. PATENT DOCUMENTS

| | | | | |
|---|---|---|---|---|
| 5,819,092 A | * | 10/1998 | Ferguson et al. | 717/113 |
| 5,845,278 A | * | 12/1998 | Kirsch et al. | 707/688 |
| 6,847,966 B1 | * | 1/2005 | Sommer et al. | 707/739 |
| 2003/0226100 A1 | * | 12/2003 | Farahat et al. | 715/500 |
| 2005/0216446 A1 | * | 9/2005 | Hall | 707/3 |
| 2007/0204308 A1 | * | 8/2007 | Nicholas et al. | 725/86 |
| 2008/0126476 A1 | * | 5/2008 | Nicholas et al. | 709/203 |
| 2010/0076904 A1 | * | 3/2010 | Ghosh et al. | 705/36 R |
| 2010/0262454 A1 | * | 10/2010 | Sommer et al. | 705/10 |
| 2011/0125774 A1 | * | 5/2011 | Dow et al. | 707/769 |
| 2011/0173225 A1 | * | 7/2011 | Stahl et al. | 707/769 |
| 2012/0124073 A1 | * | 5/2012 | Gross et al. | 707/767 |
| 2012/0124149 A1 | * | 5/2012 | Gross et al. | 709/206 |
| 2012/0213313 A1 | * | 8/2012 | Manasse et al. | 375/316 |
| 2012/0233009 A1 | * | 9/2012 | Fougner et al. | 705/26.3 |

* cited by examiner

*Primary Examiner* — Jean M Corrielus
(74) *Attorney, Agent, or Firm* — Lowenstein Sandler LLP

(57) ABSTRACT

A method for selecting a subset of content sources from a collection of content sources is disclosed. A server retrieves, in response to a plurality of queries on a topic from a client, using a programmed computer, a plurality of sets of documents from the collection of content sources. The server enumerates all subsets of the plurality of sets of documents. The server calculates, for each subset, a count of effectiveness of a subset and a price of the subset. The server selects a subset having the highest calculated ratio of count of effectiveness of the subset to price of the subset. The server delivers the selected subset of the plurality of sets of documents to the client.

22 Claims, 4 Drawing Sheets

METHOD FOR SELECTING A SUBSET OF CONTENT SOURCES FROM A COLLECTION OF CONTENT SOURCES

CROSS-REFERENCE TO RELATED APPLICATION

This application claims the benefit of U.S. provisional patent application No. 61/468,876 filed Mar. 29, 2011, the disclosure of which is incorporated herein by reference in its entirety.

FIELD OF THE INVENTION

The present invention relates to a method for selecting a subset of content sources from a collection of content sources at minimal cost while maintaining high recall (i.e., importance or relevance).

BACKGROUND OF THE INVENTION

The quantity and diversity of information and services available over the public (Internet-type) and private (Intranet-type) local and wide area networks, generically referred to as the "Internet," has grown substantially. A number of independent Internet search services exist to provide context based, content derived indexes searchable over the Internet through a query based interface. In particular, the variety of information accessible through such Internet based services is growing rapidly both in terms of scope and depth.

Access to certain information available through the Internet may be free of charge, such as from Wikipedia or Google, but access to information in much of the press release field may be available only on a for fee basis. In order to maximize the desirability for users to access a particular fee-based collection and preferably related sets of fee-based collections, a collection access provider will acquire licensed rights to make available a wide variety of individual collections of content related documents as discrete databases that can be manually selected for search by a user. Typically, searches and retrievals of information from the discrete databases are subject to specific access fees determined based on the relative commercial worth of the information maintained in the individual databases. Consequently, access fees are typically calculated on the number of documents that are variously searched, reviewed, and retrieved in preparation of a search report from a particular database.

A known problem in providing access to multiple databases is the relative difficulty or inefficiency in identifying an optimal database or set of databases that should be searched to obtain the best search report for a particular unstructured, or ad hoc, database query. In order to support even the possibility of ad hoc queries, the database search must be conducted on a full text or content established basis. Existing full text search engines typically allow a user to search many databases simultaneously. Consequently, the selection of a most appropriate set of databases to search places a substantial burden on the user for each query. The user must manually determine and select a particular set of databases that must, by definition, contain the desired results to a query. Such a database set selection is difficult since the selection is made preemptively and independent of the query. This burden may be even more of an issue where access fees are charged for conducting a search against a database even where no search responsive documents are found or examined. In the aggregate, this problem is typically referred to as the "collection selection problem."

Previous work in the related fields that attempt to solve the "collection selection problem" has centered on optimizing federated (multiple database) search by deciding which databases of a number to search, such as described in U.S. Pat. No. 5,845,278 to Kirsch et al., filed Dec. 1, 1998 and titled "Method for automatically selecting collections to search in full text searches."

In the press release field (and similar fields, such as investor relations), an organization trying to track the "viral spread" of a press release may purchase up to thousands of news feeds from websites, but the set available numbers in the tens-of-thousands. The organization attempts to find, in some ad-hoc way, without any particular theory of optimization, and without the use of any systematic algorithm, the most key news feeds, but avoid those news feeds that carry only duplications of stories that appear elsewhere. Conventional methods for avoiding duplicate stories include taking sample queries and measuring how many stories are returned from one wire, and averaging a relevance coefficient of each story. Then the next wire is queried, near duplicates with stories already retrieved are discarded, and again the average relevance is computed. This proceeds, and the wires with the highest total relevance are selected after some arbitrarily chosen number have been examined.

It is desirable to improve upon such techniques in a number of ways, in particular, to develop a systematic algorithm that overcomes the "collection selection problem," and more importantly, that is operable to combine seemingly less relevant and less-inclusive content sources (neither of which would be selected on its own) into a more comprehensive, relevant, and less costly content source.

It is also desirable that this method be operable to select a subset of content sources (e.g., newswires) from a large collection of content sources to minimize expenditure by avoiding duplicate stories but maintaining high relevance.

SUMMARY OF THE INVENTION

The above-described problems are addressed and a technical solution is achieved in the art by providing a computer implemented method and system for selecting a subset of content sources (e.g., newswires) from a collection of content sources while minimizing expenditure by avoiding duplicate stories but maintaining high relevance. According to an embodiment of the present invention, only exact duplicates are discarded. Moreover, "equivalent fractional story counts" (EFSCs) are deduced for partial duplicates.

A server retrieves, in response to a plurality of queries on a topic from a client, using a programmed computer, a plurality of sets of documents from the collection of content sources. The server enumerates all subsets of the plurality of sets of documents. The server calculates, for each subset, a count of effectiveness of a subset and a price of the subset. The server selects a subset having the highest calculated ratio of count of effectiveness of the subset to price of the subset. The server delivers the selected subset of the plurality of sets of documents to the client.

The retrieved plurality of sets of documents from the collection of content sources includes only those documents having relevance above a predetermined threshold. Relevance of a document (i.e., an equivalent fractional story count) is based on a degree of duplication between documents of an enumerated subset. The equivalent fractional story count is based on normalized word count overlaps between two documents of an enumerated subset, which may be Jaccard Counts.

In one embodiment, an exact duplicate between two documents of the enumerated subset is counted as a normalized equivalent fractional story count of one. One document of an exact duplicate between two documents of the enumerated subset may be discarded from the subset. A partial duplication between two documents of the enumerated subset may be counted as a normalized equivalent fractional story count between zero and one.

In an embodiment, the count of effectiveness, or effective story count (EFC), of a selected subset is a difference between the total number of documents in the subset and a sum of equivalent fractional story counts.

In an embodiment, the calculated price of a subset may be a sum of individual prices of documents in the subset.

In an embodiment, at least one set of the subsets of documents may change over time and may be updated. The at least one subset of the sets of documents may include newsfeeds, where the historical end of the newsfeeds continually moves forward in time. The at least one subset of the sets of documents may include evergreen, where new content is added but old content is never purged. The at least one subset of the sets of documents may be archival and is never updated.

In an embodiment, the plurality of queries may be assembled from a list of names or authorities used to probe each of the sets of documents.

In an embodiment, the plurality of queries used to probe each of the sets of documents may be continually changed over time.

In an embodiment, the plurality of queries may be taken as a set, but run individually, and the answers pooled to form one set of results for analysis.

In an embodiment, duplication elimination, exact or approximate, and subsequent document count reduction, in whole units or fractions, may be performed for each query in the set individually before merging the answers across all queries.

In an embodiment, the plurality of queries may be assembled from records of actual queries submitted by users, as recorded in query log files.

In an embodiment, the plurality of queries may be one of a sum of all queries over a predetermined time period, a subset chosen at random, or a subset chosen by importance-bias sampling. The subscription set may be adjusted automatically as the selected subset of the plurality of sets changes. The set of content sources, the types of queries in the plurality of queries, and a content budget may be managed in combination as any one changes over time.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

The present invention relates to a method for selecting a subset of content sources (e.g., tens to about a hundred newswires, newspapers, and newsletters) to which to subscribe from a potentially very large collection of content sources (e.g., tens of thousands of newswires, newspapers, and newsletters) available for paid subscriptions. Embodiment of the present invention seek to optimize a selection of the subset of content sources based on minimizing subscription costs by avoiding duplicate stories, near duplicate stories, stories that will never be retrieved, and stories that will never be read, but nonetheless maintaining high recall (i.e., not missing important or relevant stories).

As used herein, the term "program", "application", "software package" or "computer executable instructions" refers to instructions that may be performed by a processor and/or other suitable components. The term "computer" or "server", as used herein, is not limited to any one particular type of hardware device, but may be any data processing device such as a desktop computer, a laptop computer, a kiosk terminal, a personal digital assistant (PDA) or any equivalents or combinations thereof. Any device or part of a device configured to process, manage or transmit data, whether implemented with electrical, magnetic, optical, biological components or otherwise, may be made suitable for implementing the invention described herein.

As used herein, the term communicatively connected is intended to include any type of connection, whether wired or wireless, in which data may be communicated. Furthermore, the term "communicatively connected" is intended to include a connection between devices and/or programs within a single computer or between devices and/or programs on separate computers.

Although specific embodiments have been illustrated and described herein, those of ordinary skill in the art will appreciate that an arrangement configured to achieve the same results may be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used.

Figure 1:
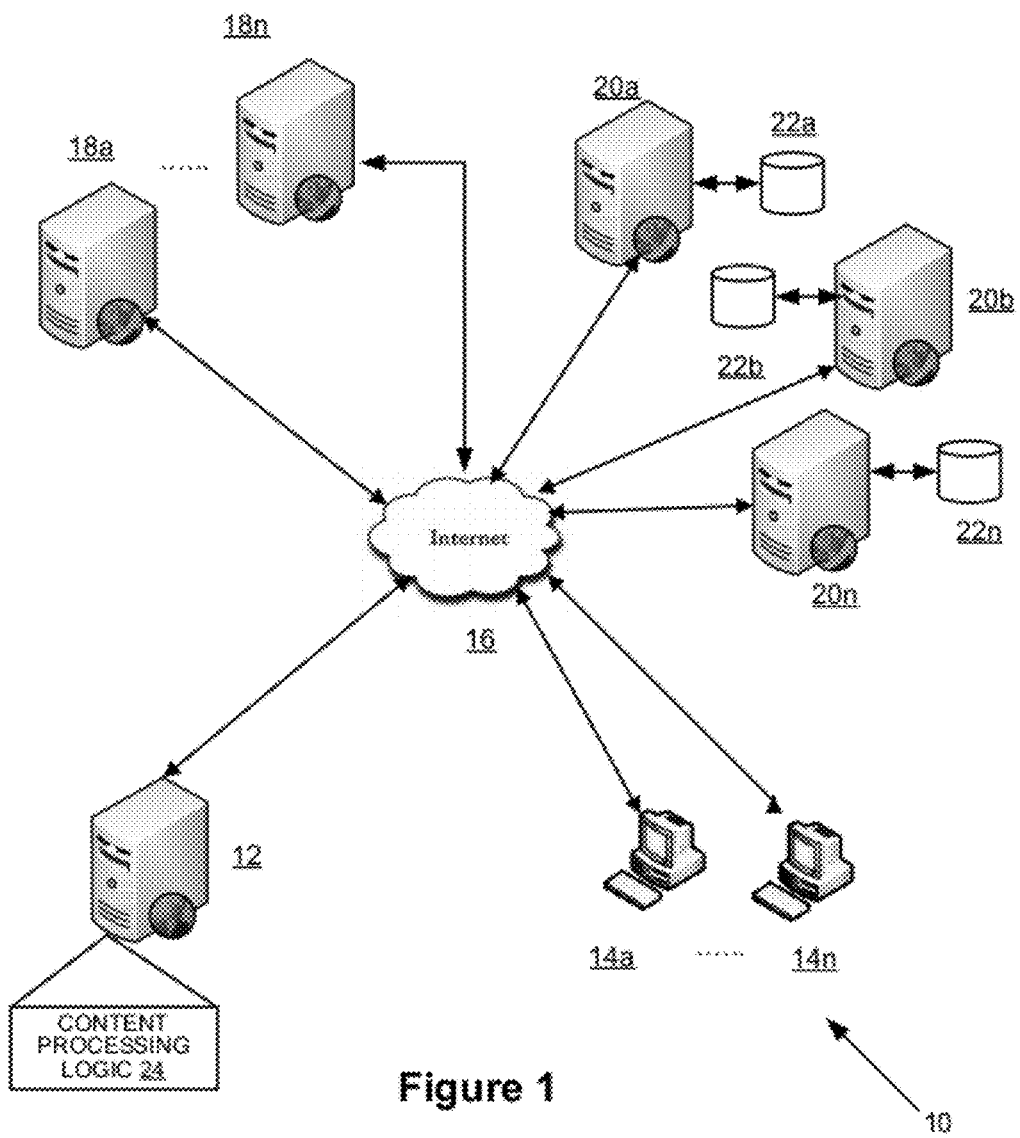
FIG. 1 is a block diagram of one embodiment of a system for selecting a subset of content sources from a collection of content sources.

FIG. 1 is a block diagram of one embodiment of a system 10 for selecting a subset of content sources from a collection of content sources. The system 10 includes a server machine 12 (hereinafter "the server 12") hosting a server-side application program for selecting a subset of content sources from a collection of content sources. The server 12 communicates with a plurality of user-identified machines 14a-14n (hereinafter, the "clients 14a-14n"), each machine hosting a client-side application program for executing a client-side application program for selecting a subset of content sources from a collection of content sources over a network 16, which may be the Internet 16. The server 12 and the clients 14a-14n are communicatively connected, e.g., over the Internet 16 to a plurality of machines 18a-18n, each hosting Web server program (hereinafter the "Web sites 18a-18n"). The Web sites 18a-18n are communicatively connected to a corresponding plurality of machines 20a-20n configured to store, manipulate, and retrieve content (hereinafter the "content servers 20a-20n") from one or more accompanying data stores 22a-22n. A collection of content sources located in the data stores 22a-22n are made accessible to the server 12 and (optionally) the clients 14a-14n over the Internet 16 through interactions with the content servers 20a-20n and the Web sites 18a-18n. In an embodiment, the method for selecting a subset of content sources from a collection of content sources according to the present invention may be stored and/or executed by a content processing logic module 24 located in the server 12. In other embodiments, the content processing logic module 24 may be distributed between the server 12 and the clients 14a-14n, or located entirely in the clients 14a-14n as would be appreciated by one of ordinary skill in the art having the benefit of this disclosure.

Figure 2:
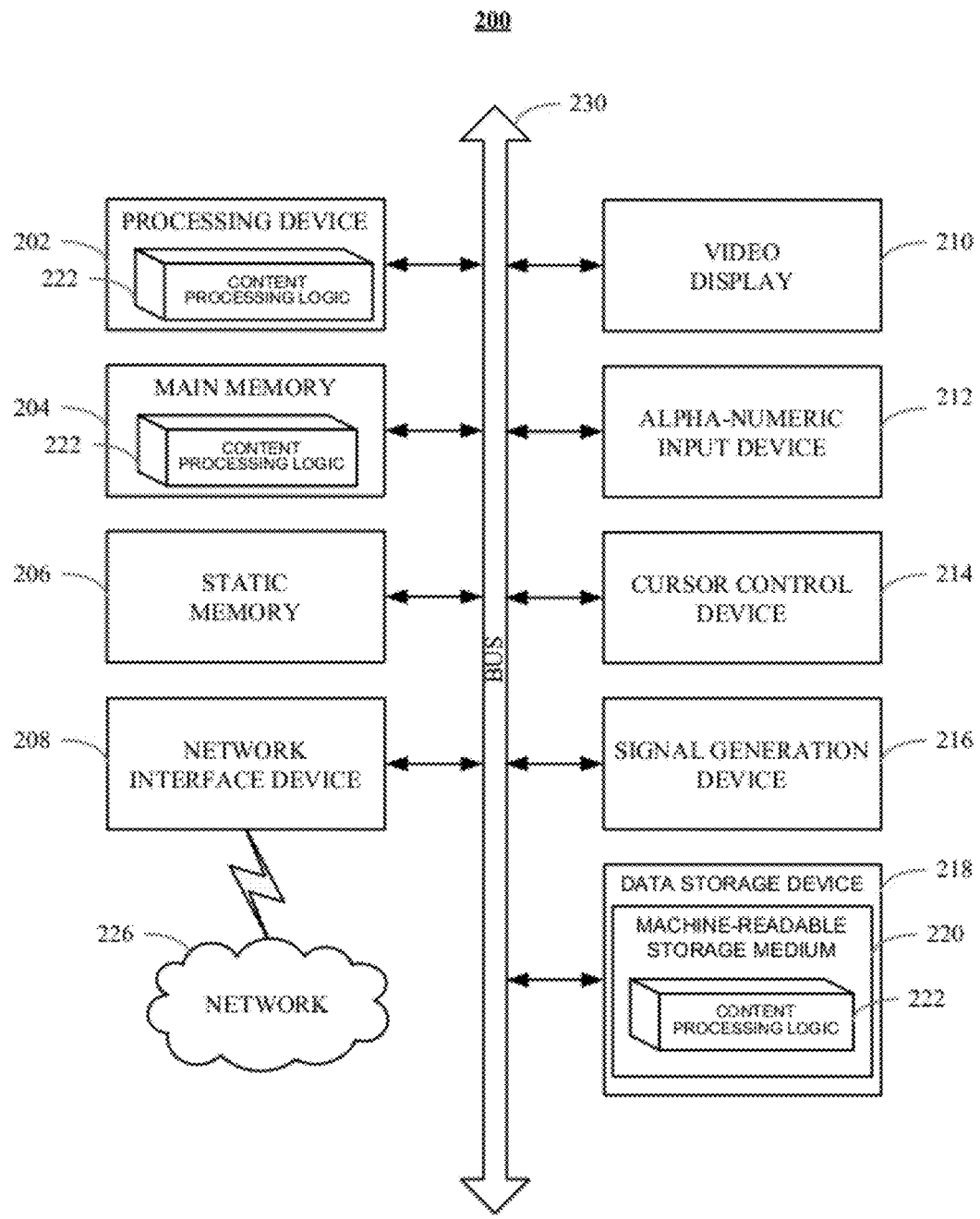
FIG. 2 illustrates a diagrammatic representation of a machine in the exemplary form of a computer system within which a set of instructions, for causing the machine to perform any one or more of the methodologies discussed herein, may be executed.

FIG. 2 illustrates a diagrammatic representation of a machine in the exemplary form of a computer system 200 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment (i.e., the server 12 and/or the clients 14a-14n), or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processing device 202, a main memory 204 (e.g., read-only memory (ROM), flash memory, dynamic random access memory (DRAM) (such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 230.

Processing device 202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 202 may also be one or more special-purpose processing devices such as an application specific integrated circuit (ASIC), a field programmable gate array (FPGA), a digital signal processor (DSP), network processor, or the like. Processing device 202 is configured to execute device queue manager logic 222 for performing the operations and steps discussed herein.

Computer system 200 may further include a network interface device 208. Computer system 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

Data storage device 218 may include a machine-readable storage medium (or more specifically a computer-readable storage medium) 220 having one or more sets of instructions (e.g., content processing logic 222) embodying any one or more of the methodologies of functions described herein. Content processing logic 222 may also reside, completely or at least partially, within main memory 204 and/or within processing device 202 during execution thereof by computer system 200; main memory 204 and processing device 202 also constituting machine-readable storage media. Content processing logic 222 may further be transmitted or received over a network 226 via network interface device 208.

Machine-readable storage medium 220 may also be used to store the device queue manager logic persistently. While machine-readable storage medium 220 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein may be implemented as discrete hardware components or integrated in the functionality of hardware components such as ASICs, FPGAs, DSPs or similar devices. In addition, these components may be implemented as firmware or functional circuitry within hardware devices. Further, these components may be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

One or more embodiments of the present invention are based on a principle that a combination of two less-inclusive newsfeeds, neither of which would be selected in a search query on its own, may out-perform a more comprehensive newsfeed. The two less-comprehensive newsfeeds, taken together, may yield a more non-duplicative news story for less expenditure than the more comprehensive newsfeed as illustrated in the method of FIG. 3.

Figure 3:
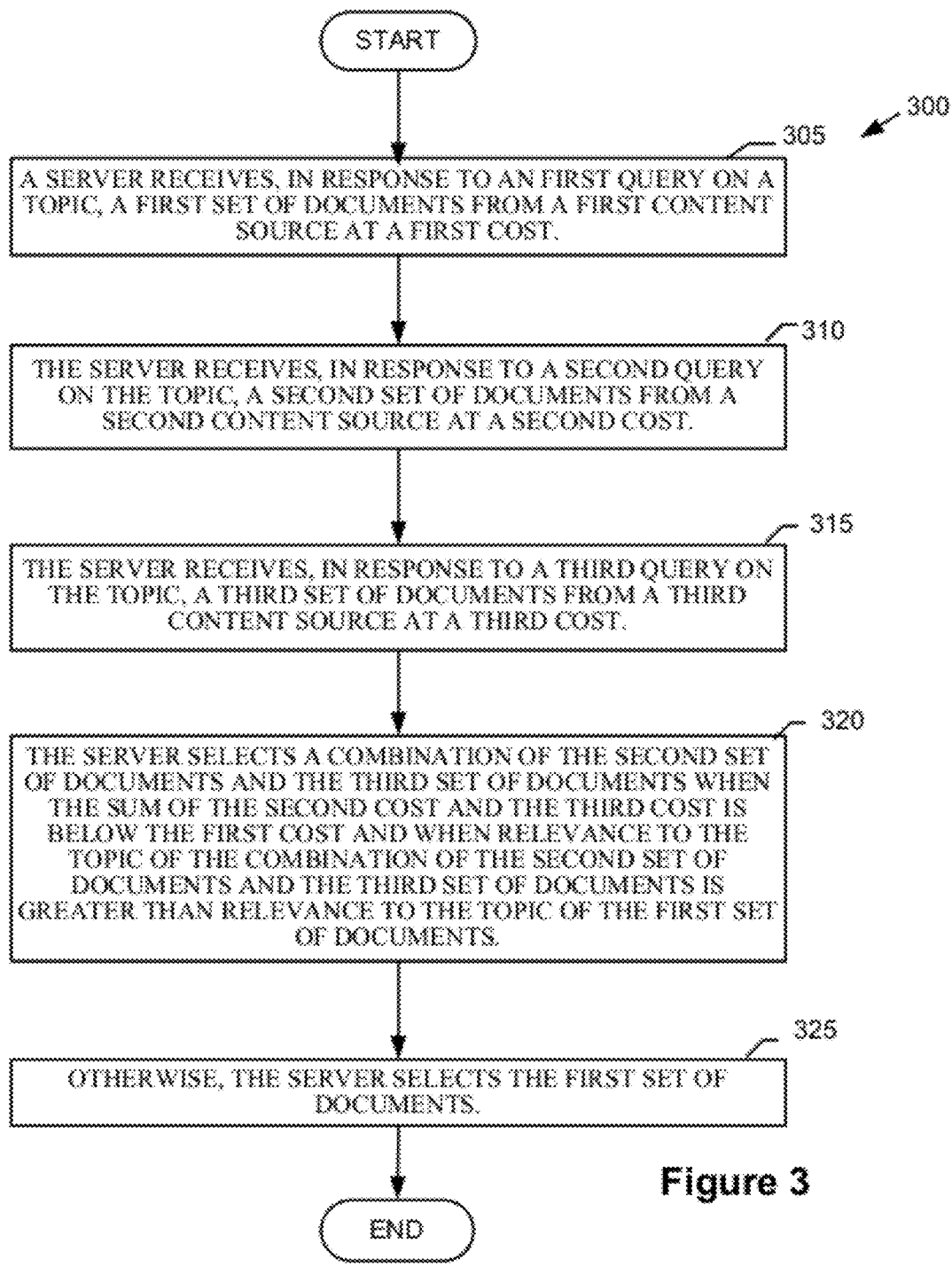
FIG. 3 is a flow diagram illustrating one embodiment of a method for selecting a set of documents from a collection of documents.

FIG. 3 is a flow diagram illustrating one embodiment of a method 300 for selecting a set of documents from a collection of documents. At block 305, the server 12 receives in response to the first query on the topic initiated by one of the clients (e.g., 14a) a first set of documents at a first cost over the Internet 16 as retrieved by a Web site (e.g., 18a) from a data store (e.g., 22a) associated with a first content server (e.g., 20a). At block 310, the server 12 receives in response to the second query on the topic initiated by the client (e.g., 14a) a second set of documents at a second cost over the Internet 16 as retrieved by the Web site (e.g., 18a) from a data store (e.g., 22b) associated with a second content server (e.g., 20b). At block 315, the server 12 receives in response to the third query on the topic initiated by the client (e.g., 14a) a third set of documents at a third cost over the Internet 16 as retrieved by the Web site (e.g., 18a) from a data store (e.g., 22n) associated with third content server (e.g., 20n). At block 320, the server 12 selects a combination of the second set of documents and the third set of documents when the sum of the second cost and the third cost is below the first cost and when relevance to the topic of the combination of the second set of documents and the third set of documents is greater than relevance to the topic of the first set of documents. If, at block 320, the above conditions are not met, then at block 325, the server selects the first set of documents for transmission and display to the client (e.g., 14a).

As a concrete example, consider an international newsfeed that has 80 stories on a particular topic. Suppose the 80 stories are purchasable for $100. The international newsfeed would typically be chosen first in a federated search optimization, ignoring two smaller regional newsfeeds, each covering a different region, and each costing $25. Suppose that each of the regional newsfeeds has 45 stories (for its region) on the topic, 40 of which are in the international newsfeed. Each regional newsfeed has a large overlap with the international feed (40/45, or 89% overlap) and would be skipped. But if the international newsfeed were put aside for the moment, the two regional newsfeeds taken together provide 90 stories and cost only $50, a considerable savings over the purchase of the international newsfeed which provides 80 stories and cost $100.

Figure 4:
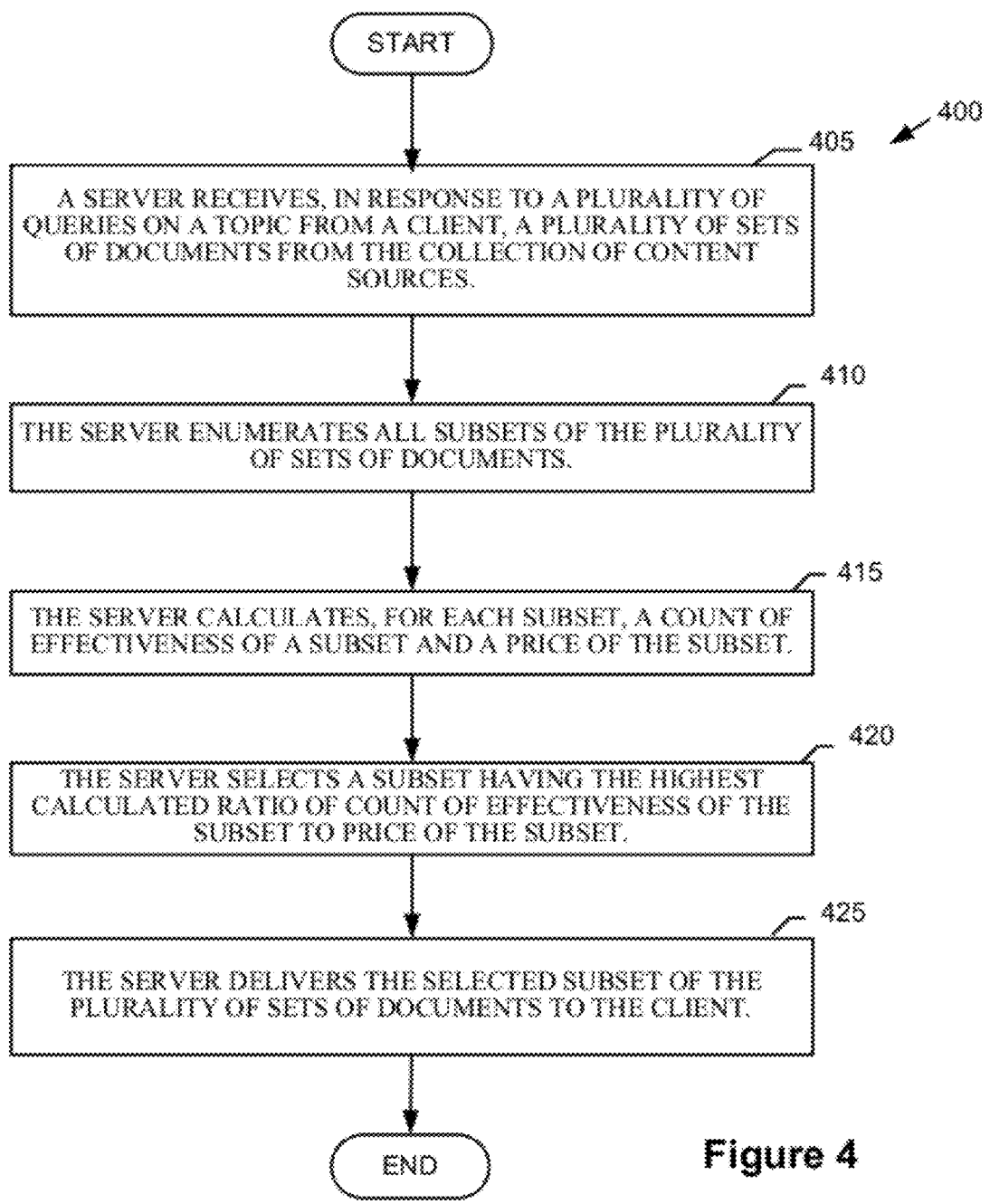
FIG. 4 is a flow diagram illustrating one embodiment of a method for selecting a subset of content sources from a collection of content sources.

FIG. 4 is a flow diagram illustrating one embodiment of a method 400 for selecting a subset of content sources from a collection of content sources. At block 405, the server 12 retrieves in response to a plurality of queries on the topic initiated by one of the clients (e.g., 14a) a plurality of sets of documents over the Internet 16 as retrieved by a Web site (e.g., 18a) from one or more data stores 22a-22n (e.g., 22a) associated with one or more content servers 20a-20n.

At block 410, the server 12 enumerating all subsets of the plurality of sets of documents. At block 415, the server 12 calculates, for each subset, a count of effectiveness of a subset and a price of the subset. At block 420, the server 12 selects a subset having the highest calculated ratio of count of effectiveness of the subset to price of the subset. At block 425, the server 12 delivers the selected subset of the plurality of sets of documents from a corresponding subset of content sources to the client (e.g., 14a). In an embodiment, the retrieved plurality of sets of documents from the collection of content sources includes only those documents having relevance above a predetermined threshold. The relevance of a document is based on a degree of duplication between documents in the subset, and the relevance of a document is herein referred to as an equivalent fractional story count (EFSC).

More particularly, for all such documents (e.g., stories) retrieved across all content sources (e.g., newswires), a count of effectiveness of a subset of documents (e.g., stories) is obtained, or rather, an Effective Story Count (ESC) is obtained. An EFC is the actual story count minus EFSC deductions. The price of each possible subset of documents (e.g., stories) is computed by adding individual prices of documents (e.g., stories) in a subset, and the subset with the best possible ESC/price ratio is found.

In one embodiment, exact duplicates are discarded and count as a subtraction of one (1) from the total story count. EFSCs are deducted for partial duplicates, with one (1) being the maximum fraction indicating total overlap between documents (e.g., stories), and zero (0) being the minimum fraction indicating no overlap between documents (e.g., stories). EFSCs are deducted as if they were physical story counts. An EFSC may be based on normalized word count overlaps between two documents of the subset. Normalized word count overlaps, also known as Jaccard Counts, are used to compute a fraction to deduct.

In one embodiment, one or more of the content collection sources may change over time and may be updated. One type of updating may include newsfeeds, where the historical end of a collection of documents (i.e., the archival point) continually moves forward in time (e.g., news is kept for the last 180 days only). Another type of updating may include evergreen, where new content is added to a collection of documents but old content is never purged. In another embodiment, one or more of the content collection sources may be archival and is never updated (e.g., Gulf War Records).

In an embodiment, a collection of possible or typical queries is assembled from a list of names or authorities to be used to "probe" each content source. An example may be a list of all public U.S. companies traded on major stock exchanges, about 5,000 company names, each of which is a compound proper noun word or phrase, and each of which may represent a sample query. Another example may be a list of all top-level industries listed in the North American Industrial Classification System, or a list of all cities in North America with population over 500,000, or a list of the names of all standing committees in the U.S. House of Representatives and Senate; in these cases again each name is considered an individual query. The queries are taken as a set, but run individually, and the answers pooled to form one set of results for analysis. Duplication elimination, both exact and approximate, and subsequent story count reduction, in whole units or fractions, as well as relevance averaging, may be employed for each query in a set individually before merging retrieved content across all queries.

In another embodiment, the query set used is not taken from lists or authority files, but from records of actual queries submitted by users, as recorded in query log files. These may be taken in total (all queries over a particular time period), a subset may be chosen at random, or a subset may be chosen by importance-bias sampling. There queries may be taken from users or from those queries deemed most important, as measured by frequency of queries, frequency of use, or external measures (for example, searches run by full professors count more than searches run by assistant professors, which in turn count more than searches run by students, and searches run by computer staff for testing are discarded entirely).

In another embodiment, the set of searches used as the probes is continually changed over time, either by virtue of the list changing (for example, the list of the names of all bills pending on the floor of the U.S. House of Representatives and Senate), or by virtue of taking more recent samples from actual users. In such cases, changes to the optimal selection of sources purchased may be noted and the appropriate decision maker may be alerted to take positive action.

In another embodiment, the subscription set is adjusted automatically as the optimal set changes, both because the content source sets change over time, and/or because the sample query probes change over time. This operation includes tracking the first possible date that a subscription may be dropped using subscription managed records, and also tracking when more or when less budget money is available to be used for subscriptions, and making changes as dictated by the altered level of expenditures.

In another embodiment, the changing nature of the content sources, the changing nature of the user queries, and the changing nature of the content budget are managed simultaneously and optimally in combination. At any moment in time, optimal subscriptions are entered in to, taking in to account the constraints that subscriptions already underway may have a certain minimum time before they can be cancelled.

Because groups of sources are managed, discounts offered by publishers for subscribing to certain sets of sources, and discounts offered by publishing aggregators at various increasing levels of expenditures, may be taken into consideration in budget calculations.

In an embodiment, content sources (e.g., newswires) are not examined sequentially, not even sequentially in contribution order. Instead, all possible subsets of the content sources (e.g., newswires) available are examined, which is an exponential problem. To overcome the exponential problem, fast computer approximation using branch-and-bound may be employed to take measurements on each possible subset that could possible be optimal. For each subset, all the stories from each content source in the subset are retrieved having relevance above a threshold. This is more meaningful than a numeric measure that averages relevance (as has been done in previous approaches), since (a) it corresponds to how people actually search, and (b) the scale for relevance is not a proper physical measurement that should be averaged across sources.

For all such stories retrieved (i.e., over all queries in the probe set, the analysis done per query and then pooled) across all the content sources (e.g., newswires), the Effective Story Count (ESC) is obtained, (i.e., the actual story count minus all EFSC deductions). The price of each possible subset is computed by summing individual prices, and then either (a) a subset with the best possible ESC/price ratio is found, or (b) for a given (fixed) price point, the subset with the best (greatest) ESC is derived and presented.

In another embodiment, a schedule, from low to high, of possible price points is listed, and the best subset for each is presented. This permits making intelligent buying decisions even when the budget is not fixed. In another embodiment, when presenting the best subset for a fixed expenditure budget price point, the best choices for one lower and/or one higher, or n lower and m higher, expenditure levels, for various integers n and m, may be presented as desired, which permits the decision maker to potentially save some money or spend a little more money than budgeted if such decisions seem wise to the buyer given the tradeoffs (reductions or improvements) in ESC that such above budget or below budget choices would lead to.

Conventional methods compute a subset of sources that has high average relevance. Embodiments of the present invention measures ESC for a given relevance cut-off threshold. As a concrete example, consider four sources as follows (assuming all articles are unique with no overlap or duplication):

Source 1. Cost $100. Contents: 10 Articles with the following (pooled over queries) relevance scores:

0.9, 0.9, 0.9, 0.7, 0.7, 0.4, 0.4, 0.4, 0.4, 0.4 Average Relevance: 6.1

Sources 2, 3, 4. Each Cost $25. Each has Content: 5 Articles with the following relevance scores:

0.9, 0.7, 0.4, 0.4, 0.4 Average Relevance: 5.6

Using "maximize average relevance", Source 1 for $100 would appear to be the best choice for a $100 budget. But buying 2, 3, and 4 for $75 not only saves budget money, but if a (typical) relevance cut-off of 0.5 is used, then the subset 2, 3, and 4 delivers six articles as opposed to five provided by Source 1.

Even if "maximize average relevance" is changed to "maximize average relevance for articles above the relevance threshold", it is still an inferior rule. In the above example, Source 1 would have a modified average relevance score of 8.2, while any combination of Sources 2, 3, and 4 would have a modified average relevance score of 8, and thus the wrong choice (Source 1 alone) would be made.

Furthermore, the six articles delivered by embodiments of the present invention will have relevance scores 0.9, 0.9, 0.9, 0.7, 0.7, 0.7, while the five articles delivered sub-optimally by average relevance will have scores 0.9, 0.9, 0.7, 0.7, which are not better (and cost more).

The present invention has numerous advantages over conventional search-and-retrieval methods. As shown in Table 1, embodiments of the present invention are configured to:

TABLE 1

1. Evaluate potential information sources based on both relevance and uniqueness (lack of duplication) simultaneously.
2. Evaluate potential information sources based on both relevance and uniqueness (lack of duplication) simultaneously.
3. Measure both exact and approximate duplicate article overlap and put them on the same scale.
4. Correctly choose a number of smaller, more specialized source collections in preference to a larger collection that appears superior on its own, but is inferior to the combination of smaller sources.
5. Present a decision maker (content buyer) with a menu of optimal choices for each budget expenditure level possible.
6. Present the single best combination that does not exceed a fixed budget level.
7. Present the single best combination that does not exceed a fixed budget level, but also present a small number of choices both above and below the fixed budget level to aid in proper decision making.
8. Properly take in to account discounts offered by publishers and content aggregators for multiple simultaneous purchases and overall spending levels.
9. Manage the optimal subscription process as it changes over time, due to the time-varying nature of content in each source, user queries, and budgets. This is done in concert with the time constraints of subscriptions.
10. Work with both fixed collections, and updating collections like newsfeeds, and combinations thereof.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but may be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    retrieving, in response to a plurality of queries on a topic from a client, by a programmed computer, a plurality of sets of documents from a collection of content sources;
    enumerating, by the programmed computer, all subsets of documents of the plurality of sets of documents corresponding to all subsets of the collection of content sources;
    calculating, by the programmed computer, for each subset of the collection of content sources, a count of effectiveness of a corresponding subset of documents and a price of the corresponding subset of documents, wherein said calculating the count of effectiveness of the corresponding subset of document comprises calculating, for each enumerated subset of documents, an equivalent fractional story count, wherein an exact duplicate between two documents of an enumerated subset of documents is counted as a normalized equivalent fractional story count of one, and wherein one document of an exact duplicate between two documents of the enumerated subset of documents is discarded from the subset of documents;
    selecting a subset of content sources having the highest calculated ratio of count of effectiveness of the corresponding subset of documents to price of the corresponding subset of documents; and
    delivering the selected subset of content sources and the corresponding subset plurality of sets of documents to the client.

2. The method of claim 1, wherein the retrieved plurality of sets of documents from the collection of content sources includes only documents having relevance above a predetermined threshold.

3. The method of claim 1, wherein the equivalent fractional story count is based on a degree of duplication between documents of an enumerated subset of documents.

4. The method of claim 1, wherein the equivalent fractional story count is based on normalized word count overlaps between two documents of an enumerated subset of documents.

5. The method of claim 4, wherein normalized word count overlaps are based on Jaccard Counts.

6. The method of claim 1, wherein a partial duplication between two documents of an enumerated subset of documents is counted as a normalized equivalent fractional story count between zero and one.

7. The method of claim 1, wherein the count of effectiveness of a selected subset of content sources is a difference between the total number of documents in the corresponding subset of documents and a sum of equivalent fractional story counts of the corresponding subset of documents.

8. The method of claim 1, wherein the calculated price of a corresponding subset of documents is a sum of individual prices of documents in the corresponding subset of documents.

9. The method of claim 1, wherein at least one subset of documents of the sets of documents changes over time and is updated.

10. The method of claim 9, wherein the at least one subset of content sources includes newsfeeds, wherein the historical end of the newsfeeds continually moves forward in time.

11. The method of claim 9, wherein the at least one subset of content sources includes evergreen, wherein new content is added but old content is never purged.

12. The method of claim 9, wherein the at least one subset of content sources of the sets of documents is archival and is never updated.

13. The method of claim 1, wherein the plurality of queries is assembled from a list of names or authorities used to probe each of the sets of documents.

14. The method of claim 13, wherein the plurality of queries used to probe each of the sets of documents is continually changed over time.

15. The method of claim 13, wherein the plurality of queries is taken as a set, but run individually, and the answers pooled to form one set of results for analysis.

16. The method of claim 15, wherein duplication elimination, exact or approximate, and subsequent document count reduction, in whole units or fractions, are performed for each query in the set individually before merging the answers across all queries.

17. The method of claim 1, wherein the plurality of queries is assembled from records of actual queries submitted by users, as recorded in query log files.

18. The method of claim 17, the plurality of queries is one of a sum of all queries over a predetermined time period, a subset of queries chosen at random, or a subset of queries chosen by importance-bias sampling.

19. The method of claim 1, wherein a subscription set is adjusted automatically as the selected subset of the plurality of sets of content sources changes.

20. The method of claim 1, wherein the set of content sources, the types of queries in the plurality of queries, and a content budget are managed in combination as any one changes over time.

21. A non-transitory computer readable storage medium including instructions that, when executed by a processing system, cause the processing system to perform a method operations comprising:

retrieving, in response to a plurality of queries on a topic from a client, by a programmed computer, a plurality of sets of documents from a collection of content sources;

enumerating, by the programmed computer, all subsets of documents of the plurality of sets of documents corresponding to all subsets of the collection of content sources;

calculating, by the programmed computer, for each subset of the collection of content sources, a count of effectiveness of a corresponding subset of documents and a price of the corresponding subset of documents, wherein said calculating the count of effectiveness of the corresponding subset of document comprises calculating, for each enumerated subset of documents, an equivalent fractional story count, wherein an exact duplicate between two documents of an enumerated subset of documents is counted as a normalized equivalent fractional story count of one, and wherein one document of an exact duplicate between two documents of the enumerated subset of documents is discarded from the subset of documents;

selecting a subset of content sources having the highest calculated ratio of count of effectiveness of the corresponding subset of documents to price of the corresponding subset of documents; and delivering the selected subset of content sources and the corresponding subset plurality of sets of documents to the client.

22. A system, comprising:

a memory;

a processing device, coupled to the memory, the processing device to:

retrieve, in response to a plurality of queries on a topic from a client a plurality of sets of documents from a collection of content sources;

enumerate all subsets of documents of the plurality of sets of documents corresponding to all subsets of the collection of content sources;

calculate, for each subset of the collection of content sources, a count of effectiveness of a corresponding subset of documents and a price of the corresponding subset of documents, wherein said calculate the count of effectiveness of the corresponding subset of document comprises calculate, for each enumerated subset of documents, an equivalent fractional story count, wherein an exact duplicate between two documents of an enumerated subset of documents is counted as a normalized equivalent fractional story count of one, and wherein one document of an exact duplicate between two documents of the enumerated subset of documents is discarded from the subset of documents;

select a subset of content sources having the highest calculated ratio of count of effectiveness of the corresponding subset of documents to price of the corresponding subset of documents; and deliver the selected subset of content sources and the corresponding subset of documents to the client.

* * * * *